(12) United States Patent
Allione et al.

(10) Patent No.: US 9,162,338 B2
(45) Date of Patent: Oct. 20, 2015

(54) METHOD FOR CUTTING A PATCH TO BE APPLIED ONTO A CURVED SUBSTRATE

(75) Inventors: Pascal Allione, Charenton-le-Pont (FR); Cedric Begon, Charenton-le-Pont (FR); Nicolas Lavillonniere, Charenton-le-Pont (FR); Agnes Ladous, Charenton-le-Pont (FR)

(73) Assignee: Essilor International (Compagnie Generale D'Optique), Charenton-le-Pont (FR)

( * ) Notice: Subject to any disclaimer, the term of this patent is extended or adjusted under 35 U.S.C. 154(b) by 1072 days.

(21) Appl. No.: 13/256,413

(22) PCT Filed: Mar. 15, 2010

(86) PCT No.: PCT/FR2010/050456
§ 371 (c)(1),
(2), (4) Date: Sep. 13, 2011

(87) PCT Pub. No.: WO2010/106275
PCT Pub. Date: Sep. 23, 2010

(65) Prior Publication Data
US 2012/0002162 A1    Jan. 5, 2012

(30) Foreign Application Priority Data
Mar. 17, 2009   (FR) .................................... 09 51662

(51) Int. Cl.
*G02C 7/02*   (2006.01)
*B24B 9/14*   (2006.01)
*G02C 7/08*   (2006.01)
*G02B 1/10*   (2015.01)

(52) U.S. Cl.
CPC . *B24B 9/146* (2013.01); *G02C 7/08* (2013.01); *G02B 1/10* (2013.01); *G02C 2202/18* (2013.01); *Y10T 83/04* (2015.04)

(58) Field of Classification Search
CPC ................................. G02C 7/022; G02C 7/024
USPC ...................... 351/178, 159.01, 159.73, 159.8
See application file for complete search history.

(56) References Cited

U.S. PATENT DOCUMENTS

| | | | |
|---|---|---|---|
| 5,764,333 A | 6/1998 | Somsel | |
| 6,113,233 A | 9/2000 | Miller | |
| 2003/0048406 A1 | 3/2003 | Morrison | |
| 2010/0007847 A1 | 1/2010 | Cano et al. | |
| 2010/0309429 A1* | 12/2010 | Haddadi | 351/174 |
| 2011/0037944 A1* | 2/2011 | Varnas | 351/169 |

FOREIGN PATENT DOCUMENTS

| | | |
|---|---|---|
| WO | 2006/105999 A1 | 10/2006 |
| WO | 2007/133208 A1 | 11/2007 |
| WO | 2007/144308 A1 | 12/2007 |
| WO | 2008/052935 A1 | 5/2008 |

* cited by examiner

*Primary Examiner* — Hung Dang
(74) *Attorney, Agent, or Firm* — Seed IP Law Group PLLC

(57) ABSTRACT

A method cuts a patch to be applied onto a curved substrate and includes the preliminary calculation of curvilinear lengths on the substrate between a reference point and a peripheral edge of said substrate. The calculated lengths are applied to a planar film for making the patch, and then the patch is cut by connecting the ends of the applied lengths. The patch then precisely coincides with the edge of the substrate. Such a method is particularly useful for applying a functional film onto a spectacle lens, as a trimming of the lens after the film is assembled with the lens would degrade said film.

15 Claims, 3 Drawing Sheets

METHOD FOR CUTTING A PATCH TO BE APPLIED ONTO A CURVED SUBSTRATE

Figure 1C:
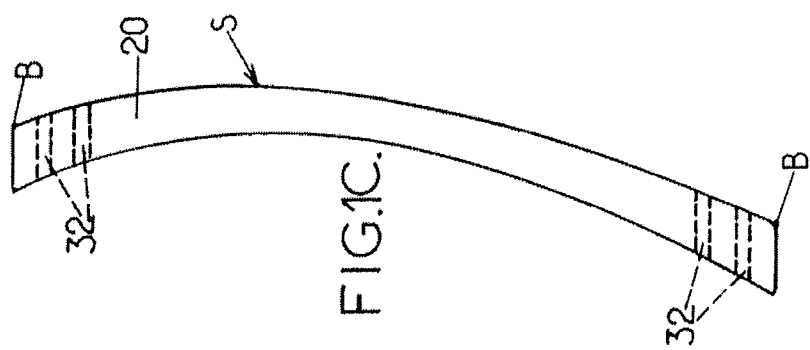

The present invention relates to a method for cutting a patch to be applied onto a curved substrate.

It is particularly useful in the ophthalmic field, for applying a patch which is cut from a planar film onto an eyeglass lens.

Numerous industrial processes include the application of a film onto a curved face of a substrate. Curved face is generally understood to mean a face which is continuous, without holes or steps in a central portion of this face which is optically useful, and which has curvature in at least one direction. The face of the substrate may have, at each point on it, two curvatures which are equal or different in two directions tangential to this face at the point in question, and these two curvatures may or may not vary from one point to another. Thus the curved face may correspond to a complex surface referred to as pseudospherical by a person skilled in the art. In particular, the face of the substrate can be non-developable.

For economic reasons, the film to be applied onto the substrate is initially planar, but may be flexible. In other words, it is flexible but its shape always remains developable, meaning that the film can be unrolled into a planar configuration without stretching or tearing. Such a film can be manufactured in a planar or rolled configuration.

Usually, a portion of the film is cut out which is larger than the face of the substrate to be covered. It is then applied and attached to the substrate, and the excess part of the film which projects beyond a peripheral edge of the substrate face is removed. This excess part is wasted, contributing to the consumption of the uncut film initially provided. Also, the portion of the film which projects beyond the substrate face may be difficult to remove. For example, the excess portion of the film on the substrate may be cut off by running a blade along the edge of the substrate face, but such a procedure is long and difficult to automate. Alternatively, the excess portion of the film may be abraded by pressing the substrate edge against a grinding wheel. In all cases, removing the excess portion of film is a specific step in the production of the final product, during which the substrate and the film must be held firmly on a holding device. This can result in scratching, crumpling, or tearing the film, which is incompatible with the quality requirements for the final product. Such quality requirements are particularly restrictive when an optical product is concerned, particularly an ophthalmic product such as an eyeglass lens. Also, separating the excess portion of film while it is still contiguous to the substrate can result in detaching or tearing the parts of the film on the substrate.

An object of the invention therefore consists in providing an improved method for applying a film onto a curved substrate, which does not have the above disadvantages.

In particular, one object of the invention is to provide a curved substrate which is covered with a film portion, with a good coincidence between the respective edges of the film portion and the substrate.

Another object of the invention is to obtain a final product which comprises the substrate covered by the film portion and which is of a sufficient level of quality.

To achieve this, the invention proposes a method for cutting a patch in a planar film, for the purposes of applying this patch onto a curved face of a substrate which is bounded by a peripheral edge, said method comprising the following initial steps:

/1/ obtaining three-dimensional coordinates for a set of points forming a meshing on the face of the substrate, and /2/ determining a reference point in the substrate face, a reference axis which passes through the substrate face at this reference point, a reference plane which is tangent to the substrate face at the reference point, and a series of sampling points which are distributed along the peripheral edge of this face.

The method additionally comprises the following steps /3/ to /5/, which are performed for each sampling point of the peripheral edge of the substrate face:

/3/ determining a development plane which contains the reference axis and which passes through the sampling point of the peripheral edge, /4/ from the coordinates of the meshing points obtained in step /1/, calculate a curvilinear length between the reference point and the sampling point in question of the peripheral edge, by following a curved segment at the intersection of the substrate face with the development plane, and /5/ applying this curvilinear length, starting from the reference point, along a straight line at the intersection between the development plane and the reference plane tangent to the substrate face at the reference point, to form a straight line segment issuing from the reference point and having the length calculated in step /4/, and then the following steps:

/6/ connecting the ends of the straight line segments which are opposite the reference point, by an interpolated contour contained within the reference plane, and /7/ transferring the interpolated contour onto the film and cutting out the patch based on this contour.

Thus, in a method of the invention, the patch is cut directly to the dimensions of the curved face of the substrate before it is applied to this face. To this purpose, the method comprises preliminary steps which allow determining the final position of the edge of the substrate face in the film. This position of the edge is determined by calculating curvilinear lengths of radii of the curved face of the substrate, then transferring these lengths onto the planar film. A contour is thus traced on the film, which coincides with the edge of the substrate face when the patch is finally applied to this face.

A method of the invention therefore comprises only one film cutting step, reducing the production time for the end product. In particular, no correction to the cut edge of the patch is necessary, even after the patch has been applied to the substrate.

In addition, in step /7/ the patch may be cut from the film to its dimensions in the end product. This decreases the loss of film raw material due to cutting waste.

The patch is cut when it is separate from the substrate. The cutting operation is therefore simplified, particularly when the film is still in planar configuration. In particular, a cutting method can easily be implemented which preserves the quality of the film and produces a cut edge that has no defects.

Lastly, all the steps of a method of the invention may be carried out digitally by an appropriate computer program. Their implementation therefore can be fast and inexpensive.

Such a method is particularly suitable when the substrate face is a continuous non-developable surface.

In an improvement of the invention, the method may also comprise the following additional step which is performed after step /7/:

/8/ applying the patch onto the curved face of the substrate by shaping it to conform to this face, so that each straight line segment transferred onto the film is angularly directed towards the corresponding sampling point on the edge of the substrate face.

During this additional step, the patch is applied onto the substrate face starting at an initial contact point, without any sliding relative to the substrate at this point. The initial contact point is apart from the reference point transferred onto the film by less than a fourth of a diameter of the peripheral edge.

It is possible for the peripheral edge of the curved face of the substrate to comprise an external peripheral edge of this face and at least one hole located in this latter face and inside the external peripheral edge. The invention then allows cutting out the patch along the external edge and along the hole edge so that these two edges of the patch precisely and simultaneously coincide with a hole edge and an external peripheral edge of the substrate.

A method of the invention is particularly suitable when the substrate comprises an ophthalmic lens, and the peripheral edge of the substrate face is determined as a function of an eyeglass frame into which the lens is to be fitted. In this case, the patch is preferably applied onto the face of the eyeglass lens which forms the substrate after the lens has been trimmed. The patch and the lens are thus given their final dimensions separately, then are assembled together with no later modification to the peripheral edge of the lens or the edge of the patch being necessary.

Figure 1B:
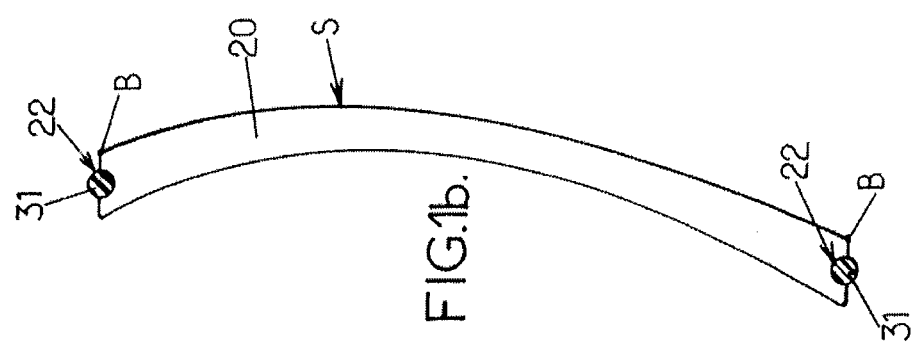
Figure 1A:
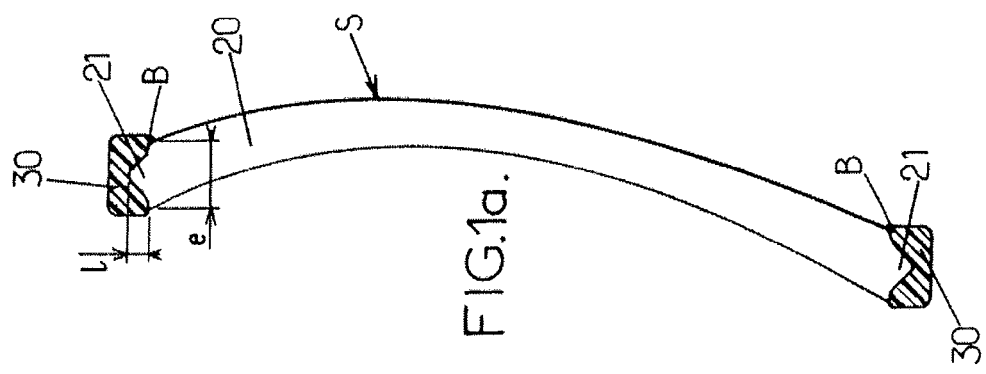
Figure 2:
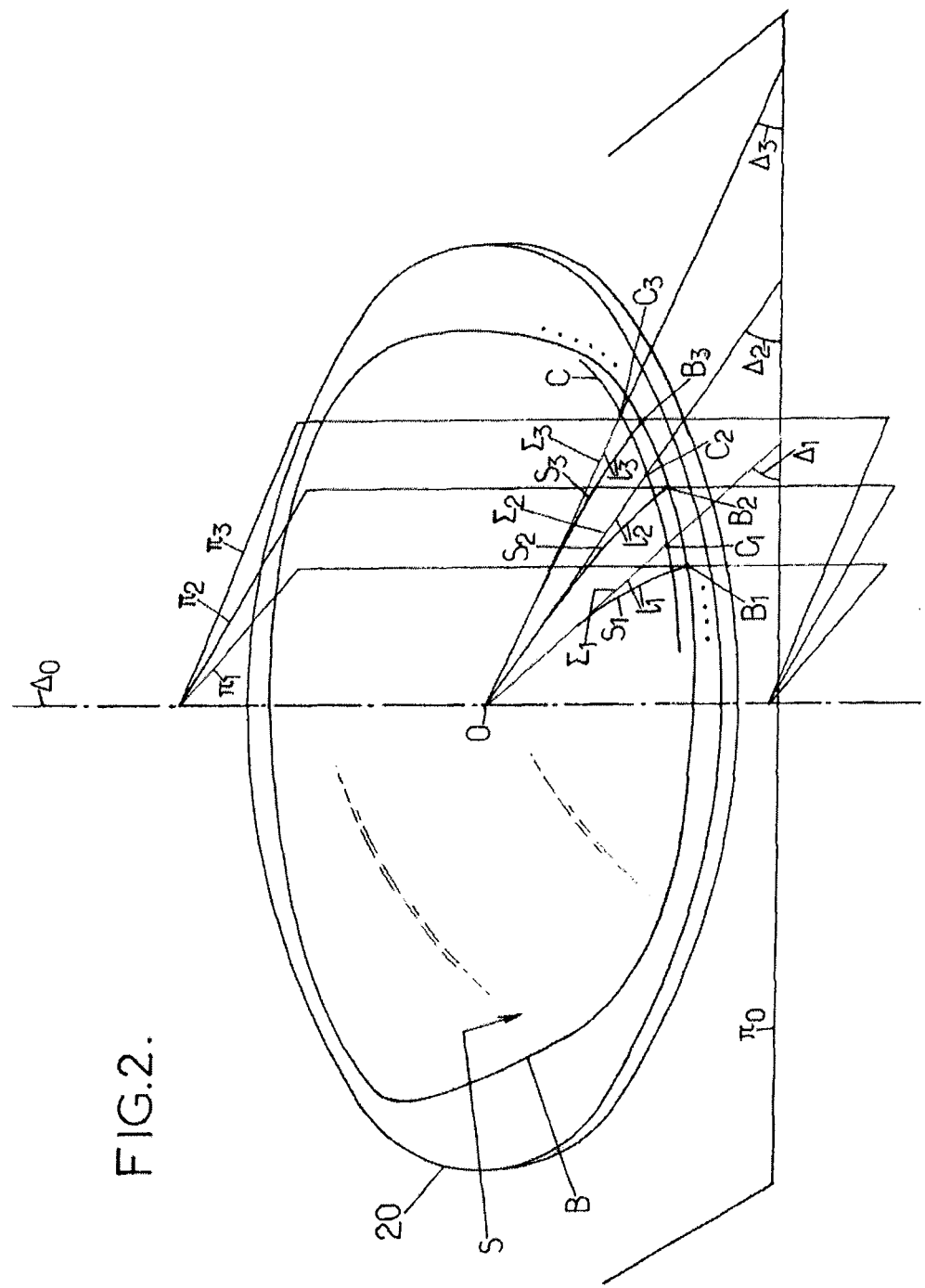
Figure 3:
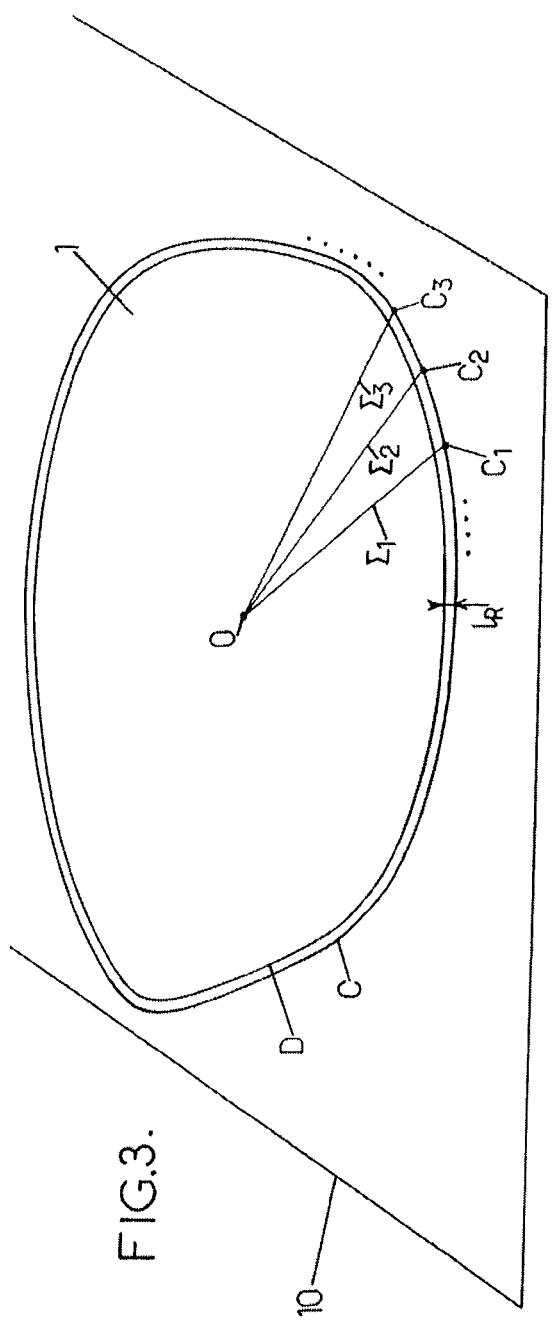
Figure 4:
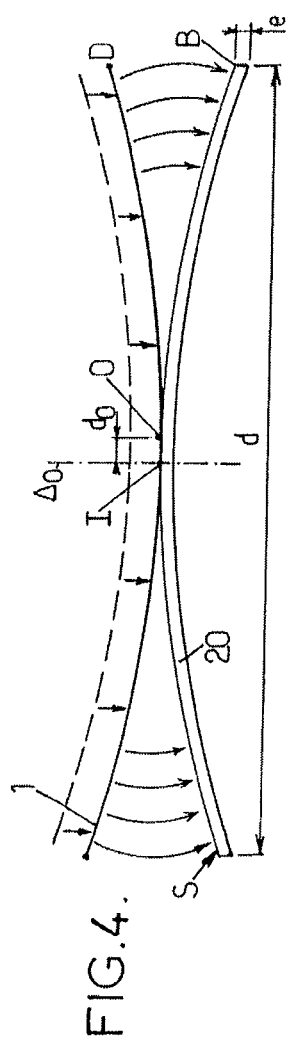

Other features and advantages of the invention will become apparent from the following description of some non-limiting examples, referencing the attached drawings in which:

FIGS. 1a to 1c are cross-sectional views respectively illustrating three assemblies of an ophthalmic lens in an eyeglass frame, FIG. 2 represents geometric elements used in a method of the invention, FIG. 3 illustrates a variant implementation of a method of the invention, and FIG. 4 illustrates an application of a method of the invention.

The invention is now described in the context of an ophthalmic application, for the production of an eyeglass lens.

The substrate, denoted 20 in the figures, may itself be an eyeglass lens which is referred to as the base lens. It has a front face which is convex and a rear face which is concave. Preferably, the base lens 20 has already been trimmed to the dimensions of an ophthalmic eyeglass frame into which the final lens is to be mounted. Such trimming may be performed in the conventional manner, using for example a grinding or milling tool known to a person skilled in the art.

After trimming, the base lens 20 has a peripheral edge B which bounds its two faces and conforms to the shape of the rim of the eyeglass frame. In addition, the cross-sectional profile of the edge of the lens is adapted to the assembly mode for fitting the lens into the frame.

In a first assembly mode illustrated in FIG. 1a, this cross-sectional profile may have a protruding rib 21, intended to fit into a groove in the frame 30 which runs along the rim that houses the lens. In this case, each of the front and rear faces of the lens 20 have a peripheral edge B which is set back relative to the apex of the rib 21. This is commonly referred to as a bevel and it may be constant or may vary along the lens edge. FIG. 1a shows the bevel height of the assembly, denoted b. It is possible for this bevel height b to be reduced by a heeling height which is determined based on the thickness e of the lens 20.

A second assembly mode, illustrated by FIG. 1b, is appropriate when the rim that retains the lens in the frame 30 is open along a portion of the peripheral edge of the lens. The lens 20 may then be retained in the frame by a wire 31, for example a nylon wire, which presses against the lens along the open portion of the rim of the eyeglass frame. The edge of the glass then has a groove 22 for receiving the wire 31.

Another assembly mode, illustrated by FIG. 1c, concerns "frameless" eyeglasses. In this case, the frame does not have a rigid portion which follows the peripheral edge of each lens, but consists of separate frame segments which are screwed into the lens near the edge B of the lens. The edge B of the lens 20 is then free and can have any profile, most often a straight-line profile. At least two holes 32 are then provided in the lens 20, each for receiving a screw, possibly with a screw sleeve or a locking pin (neither is represented). In various embodiments of this assembly mode, each hole 32 may pass completely through between the front and rear faces of the lens, or may be a blind hole which is open in only one of these faces.

A template is then commonly used, which is usually planar and which determines the shape of the peripheral edge of the lens as the rim of a frame would do, as well as the position of the holes relative to this edge. In the invention, the peripheral edge of the lens which bounds the lens face used for the invention may comprise, in addition to the external peripheral edge of the lens which is denoted as B in the figures, the edge(s) of one or more hole(s) which is/are located inside this external peripheral edge and which is/are intended for screw mounting.

Prior to trimming the lens 20, the shape of the rim that retains the lens in the frame 30 is determined using a contour measurement tool. Such a tool is assumed to be known, and its description is not restated here. It may perform a two- or three-dimensional reading of the boundaries of the rim of the frame, or of the boundaries of a template for the lens. In the two-dimensional case, a projection of these boundaries into a fixed plane is obtained, which is equivalent to eliminating a sagittal coordinate of each point in the rim boundaries.

A portion 1 of a functional film 10 is intended to be applied onto the back face or front face of the base lens 20. The film 10, from which the patch 1 is cut out, may be intended to give the final lens other functions in addition to those of the base lens 20. For example, the film 10 may be selected from among the following films:

an organic film which has at least one functional coating on a face of the film, for example an antireflective coating,
a film which has a Fresnel structure, providing optical power to the film itself, or
a multilayer structure which comprises a set of juxtaposed cells parallel to a face of this structure.

The use of a multilayer cellular structure is particularly favorable for obtaining certain optical properties, by using appropriately selected optical substances which are placed in the cells. In particular, specific properties can be provided to the final lens on demand, at a reduced cost price and time to delivery.

The film 10 is initially planar or is developable, particularly when it is manufactured on a production support which is planar or when it is supplied in a roll.

The face of the base lens 20 onto which the patch 1 is to be applied may be of any shape. For example, it may be spherical, toric, or complex. In the latter case, the base lens 20 may be a progressive lens, with a curvature of its face which increases between two points respectively corresponding to a far-vision direction and a near-vision direction. Only for illustrative purposes, in the following description it is assumed that the patch 1 is to be applied to the convex front face of the base lens 20. This face is denoted S in the figures.

The face S of the base lens 20 is first characterized using the three-dimensional coordinates of a set of points which belong to this face. These points form a meshing on the face S, which may be regular or irregular and of a pitch which may easily be selected by a person skilled in the art according to the required precision in superimposing the edge of the patch 1 with that of the base lens 20 in the final product. In a known manner, the points of a meshing form a sampling of the face to which they belong, and this face can be reconstructed to later by interpolation between these points, with an accuracy which depends on the density of the meshing. The coordinates of the meshing points of the face S can be obtained in several ways. In a first method which is particularly suitable when the face S has a simple shape, particularly when it is spherical or toric, the coordinates of the meshing points may be calculated from two curvature values for this face along two perpendicular directions. In a second manner, the coordinates of the meshing points of this face S may be read from a digital file stored on a storage medium. For example, this file may be selected from a library, based on data from an ophthalmic prescription corresponding to the lens. Lastly, in a third method which is appropriate when the face S is not initially known, the coordinates of the meshing points of the face S may be determined from one or more optical or geometric measurement(s) which is/are performed on the base lens.

The latter two methods for obtaining a meshing of the face S are particularly appropriate when the base lens is a progressive lens. Such progressive lens is usually characterized by two curvature values at a first reference point which corresponds to the far-vision direction through the lens, and by an add value which characterizes the variation of one of these curvatures between a second reference point corresponding to a near-vision direction and the first reference point for the far vision. The inventors then noticed that, for curvature values at the reference point for far vision and an added value which are fixed, the exact design of a progressive face has little effect on the ultimate coincidence between the respective edges of the patch 1 and the base lens 20. As a result, the coordinates of meshing points obtained for a known progressive lens can be used for another progressive lens, as long as the two lenses have identical values for their curvatures at the reference point for far vision and have identical add values.

Also determined are a reference point O on the face S, a reference axis $\Delta_0$ which traverses the face S at the point O, and a reference plane $\pi_0$ which is tangent to the face S at the point O. The point O, the axis $\Delta_0$, and the plane $\pi_0$ are fixed. The point O and the axis $\Delta_0$ may be selected in the manner described below, in relation to the application of the patch 1 onto the base lens 20. In addition, the axis $\Delta_0$ can advantageously also coincide with the axis of rotation of the tool used to read the shape of the rim for housing the lens in the frame, or to read the shape of the template for the final lens in the case of frameless eyeglasses. The reference axis $\Delta_0$ is not necessarily perpendicular to the reference plane $\pi_0$.

Then a series of sampling points distributed along the peripheral edge of the face S are determined. In FIG. 2, B again denotes the peripheral edge of the face S of the base lens 20, and $B_1, B_2, B_3, \ldots$ indicate the sampling points of the edge B. Preferably, the series of sampling points of the edge B comprises at least 300 points, or even 700 points, which may be angularly equidistant along the edge B relative to the reference point O. In principle, the sampling points $B_1, B_2, B_3, \ldots$ on the edge B have no relation to the meshing points in the face S, although they all belong to this face of the base lens 20. When the face S of the base lens 20 comprises one or more holes, additional sampling points are determined on the edge of each hole, and the steps of the method which are described below for the external peripheral edge of the lens are also applied in an identical manner to the edge of each hole in the face S.

Next, a separate development plane for each sampling point of the edge B is considered, which contains the reference axis $\Delta_0$ and passes through that sampling point. As illustrated in FIG. 2, the development plane $\pi_1$ passes through the point $B_1$, the development plane $\pi_2$ passes through point $B_2$, etc. The intersection of the development plane $\pi_1$ with the face S is then a curved segment which is denoted $S_1$. Then the length of the segment $S_1$ is calculated between the reference point O and the sampling point $B_1$. This length is denoted and is obtained by the following curvilinear integral:

$$l_t = \int_O^{B_1} ds = \int_O^{B_1} \sqrt{(dx^2 + dy^2 + dz^2)}$$

where s denotes a unit of curvilinear length along the curved segment $S_1$, and x, y, z are the Cartesian coordinates of the points of the meshing of the face S.

The intersection between the development plane $\pi_1$ and the reference plane $\pi_0$ is a straight line which is denoted $\Delta_1$. The length $l_1$ is then applied along the straight line $\Delta_1$, starting from the point O and in the same radial direction as for the point $B_1$. A straight line segment $\Sigma_1$ is thus obtained, of length $l_1$, which connects the reference point O to an end point denoted $C_1$.

The same operations are repeated for each of the other points $B_2, B_3, \ldots$ of the sampling series of the edge B of the face S. The points $C_1, C_2, C_3 \ldots$ correspond respectively to the points $B_1, B_2, B_3 \ldots$ when the face S of the base lens 20 is unrolled along the corresponding straight line $\Delta_1, \Delta_2, \Delta_3, \ldots$. In other words, the points $C_1, C_2, C_3 \ldots$ constitute the boundaries of the face S if it is laid planar in the reference plane $\pi_0$, while maintaining the radial distances $l_1, l_2, l_3, \ldots$ from the point O as well as the angles of distribution around this point. The straight line segments $\Sigma_2, \Sigma_3, \ldots$ respectively correspond to $\Sigma_1$ but for the points $B_2, B_3, \ldots$.

Then the points $C_1, C_2, C_3, \ldots$ are connected in order around the point O, interpolating between two successive points. The contour obtained in this manner, which is denoted C in FIGS. 2 and 3, is called the interpolated contour. This contour C is then applied onto the film 10 and the patch 1 is cut out, for example using a laser cutting method.

In a first possibility, the line for cutting out for the patch 1 is superimposed over the contour C. Such a procedure is particularly appropriate when a wire will maintain the lens within the rim of the frame or when the lens is to be mounted in frameless eyeglasses, and the patch 1 must cover the base lens 20 out to the edge B. Because of the invention, the patch 1 determined and cut in this manner has an edge which precisely coincides with the edge B of the face S of the base lens 20, after the patch 1 has been applied to this face while adopting the curved form of said face.

In a second possibility which is illustrated in FIG. 3, the line for cutting out the patch 1 is offset to inside the contour C in the plane of the film 10. The line is denoted D, and the amount the line D is offset inside the interpolated contour C is denoted $l_R$. To achieve this, each straight line segment $\Sigma_1, \Sigma_2, \Sigma_3, \ldots$ which is transferred onto the film 10 is decreased by the offset length $l_R$, at the end of this segment which is opposite the point O. Depending on the various to implementations of the method which has just been described, the offset length $l_R$ may be equal to:

the bevel height b which is determined by the mode for fitting the lens in the frame, and which may possibly be decreased by the heeling height, or a thickness of a strip which is to be placed around the patch 1 along the cut edge D, for example to close off the cells of the film 10 which were opened when the patch 1 was cut, or a correction which corresponds to the deformation of the patch 1 when it is applied to the face S of the base lens 20, or a sum of at least two of the above height/thickness/correction lengths.

The offset length $l_R$ ensures that the patch 1, possibly with a peripheral strip, does not project beyond the edge B of the face S of the base lens 20, even when said base lens has a bevel for mounting it in the eyeglass frame.

FIG. 4 illustrates the application of the patch 1 onto the base lens 20. The patch 1 is applied onto the face S preferably by starting from an initial contact point which is denoted I. The contact surface between the patch 1 and the face S is then progressively increased, with a contact boundary which surrounds the point I and moves radially in the direction of the edge B. In this manner, no air bubble is trapped between the patch 1 and the base lens 20, and the stresses undergone by the patch 1 can be reduced. Of course, the patch 1 is applied onto the face S so that each segment $\Sigma_1, \Sigma_2, \Sigma_3, \ldots$ is angularly directed towards the corresponding point $B_1, B_2, B_3 \ldots$. The space between the edge of the patch 1 and the edge of the face S of the base lens 20 can then be less than 150 μm (micrometers), such that it is not visible and does not interfere with the aesthetic appearance of the final lens.

Precautions may advantageously be taken to reduce the risk of the patch 1 sliding relative to the base lens 20, particularly at the initial contact point I, when the patch is applied onto the face S. To achieve this, the reference point O is preferably determined at the start of the method of the invention to be located near the initial contact point I. In particular, the initial contact point I and the reference point O which is transferred onto the film 10 may be apart from each other by less than a fourth of the diameter d of the smallest circle containing the entire peripheral edge B, or even less than a tenth of this diameter. This distance between the points I and O is denoted $d_0$ in FIG. 4. The reference axis $\Delta_0$ is preferably parallel to the direction in which the patch 1 approaches and is applied to the face S.

It is understood that the invention may be reproduced by modifying certain aspects of its implementation which have just been detailed, while still retaining at least some of the advantages of the invention. In particular, certain geometric steps may be changed while remaining equivalent in principle. The invention may also be used to apply a patch onto a face of a substrate which is concave.

The invention claimed is:

1. A method, comprising:
   obtaining three-dimensional coordinates for a set of meshing points forming a mesh on a curved face of a substrate which is bounded by a peripheral edge of said face,
   determining a reference point in the substrate face, a reference axis which passes through the substrate face at said reference point, a reference plane which is tangential to the substrate face at said reference point, and a series of sampling points along the peripheral edge of said substrate face,
   performing the following substeps for each sampling point of the peripheral edge:
      determining a development plane which contains the reference axis and which passes through said sampling point of the peripheral edge,
      from the coordinates of the meshing points, calculating a curvilinear length between the reference point and said sampling point of the peripheral edge, by following a curved segment at an intersection of the substrate face with the development plane,
      applying the curvilinear length, starting from the reference point, along a straight line at an intersection between the development plane and the reference plane, to form a straight line segment issuing from said reference point and having the calculated curvilinear length,
      connecting ends of the straight line segments opposite the reference point, by an interpolated contour contained within the reference plane, and
      transferring the interpolated contour onto a planar film and cutting out a patch from the film based on said interpolated contour.

2. A method according to claim 1, wherein the face of the substrate is a continuous non-developable surface.

3. A method according to claim 1, additionally comprising:
   applying the patch onto the curved face of the substrate by shaping said patch to conform to said face, so that each straight line segment transferred onto the film is angularly directed towards the corresponding sampling point on the edge of the substrate face,
   the applying including applying the patch to the face of the substrate starting at an initial contact point without said patch sliding relative to the substrate at said initial contact point, said initial contact point being apart from the reference point transferred onto the film by less than a fourth of a diameter of the smallest circle encompassing the entire peripheral edge.

4. A method according to claim 3, wherein the initial contact point is apart from the reference point transferred onto the film by less than a tenth of the diameter of the smallest circle encompassing the entire peripheral edge.

5. A method according to claim 1, wherein the substrate comprises an ophthalmic lens, and the peripheral edge of the curved face of said substrate is determined as a function of a rim of an eyeglass frame into which said lens is to be mounted.

6. A method according to claim 5, wherein the patch is applied onto the face of the ophthalmic lens forming the substrate after said lens has been trimmed to conform to the peripheral edge.

7. A method according to claim 5, wherein cutting out the patch includes cutting out the patch along a cutting contour obtained based on the interpolated contour, by decreasing each straight line segment transferred onto the film, at an end of said straight line segment opposite the transferred reference point, by an offset length equal to one of:
   a bevel height determined by a mode for fitting the lens in the frame,
   a bevel height determined by a mode for fitting the lens in the frame and decreased by a heeling height determined based on a thickness of the lens,
   a thickness of a strip intended to be placed around the patch along said cut edge,
   a correction corresponding to a deformation of the patch when said patch is applied to the curved face of the lens, and
   a sum of at least two of the above height/thickness/correction lengths.

8. A method according to claim 5, wherein the series of sampling points comprises at least 300 points.

9. A method according to claim 5, wherein the sampling points on the peripheral edge of the substrate face are angularly equidistant along said peripheral edge relative to the reference point.

10. A method according to claim 5, wherein the face of the ophthalmic lens forming the substrate is spherical or toric, and wherein obtaining the coordinates of the meshing points on said face includes calculating the coordinates of the meshing points based on two curvature values for said face along two perpendicular directions.

11. A method according to claim 5, wherein obtaining the coordinates of the meshing points includes reading the coordinates of the meshing points from a digital file, said file being selected from a library based on data from an ophthalmic prescription corresponding to said lens.

12. A method according to claim 5, wherein obtaining the coordinates includes determining the coordinates of the meshing points by at least one optical or geometric measurement carried out on said lens.

13. A method according to claim 12, wherein the face of the ophthalmic lens forming the substrate is progressive.

14. A method according to claim 5, wherein the planar film from which the patch is cut is selected from among the following films:
- an organic film having at least one functional coating on a face of said film,
- a film having a Fresnel structure such that said film has optical power, or
- a multilayer structure comprising a set of juxtaposed cells parallel to a face of said structure.

15. A method according to claim 1, wherein the peripheral edge of the curved face of the substrate comprises an external peripheral edge of said face and at least one hole located in said face and inside said external peripheral edge.

* * * * *